US011989308B2

(12) United States Patent
Kumar et al.

(10) Patent No.: US 11,989,308 B2
(45) Date of Patent: May 21, 2024

(54) METHOD TO INTELLIGENTLY MANAGE THE END TO END CONTAINER COMPLIANCE IN CLOUD ENVIRONMENTS

(71) Applicant: EMC IP Holding Company LLC, Hopkinton, MA (US)

(72) Inventors: Suren Kumar, Bangalore (IN); Vinod Durairaj, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 391 days.

(21) Appl. No.: 17/383,252

(22) Filed: Jul. 22, 2021

(65) Prior Publication Data
US 2022/0382879 A1 Dec. 1, 2022

(30) Foreign Application Priority Data

May 27, 2021 (IN) .............................. 202111023665

(51) Int. Cl.
*G06F 21/57* (2013.01)
*G06N 5/02* (2023.01)

(52) U.S. Cl.
CPC ............. *G06F 21/577* (2013.01); *G06N 5/02* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 10,154,065 B1 * | 12/2018 | Buchler | G06F 21/6218 |
| 2012/0174228 A1 * | 7/2012 | Giakouminakis | H04L 63/1416 |
| | | | 726/25 |
| 2017/0353496 A1 * | 12/2017 | Pai | H04L 63/10 |
| 2018/0114025 A1 * | 4/2018 | Cui | G06F 8/65 |
| 2018/0309747 A1 * | 10/2018 | Sweet | G06F 9/45558 |
| 2018/0336351 A1 * | 11/2018 | Jeffries | G06F 21/53 |
| 2019/0114435 A1 * | 4/2019 | Bhalla | G06F 21/55 |
| 2020/0082094 A1 * | 3/2020 | Mcallister | G06F 8/77 |
| 2020/0082095 A1 * | 3/2020 | Mcallister | G06F 11/323 |
| 2020/0097662 A1 * | 3/2020 | Hufsmith | H04L 9/0643 |
| 2020/0167477 A1 * | 5/2020 | Ionescu | G06F 21/577 |
| 2022/0171856 A1 * | 6/2022 | Bhatt | G06F 21/52 |
| 2022/0374218 A1 * | 11/2022 | Monteiro Vieira | G06F 8/433 |

* cited by examiner

*Primary Examiner* — Kaveh Abrishamkar
(74) *Attorney, Agent, or Firm* — Workman Nydegger

(57) ABSTRACT

One example method includes collecting container information concerning a container, analyzing the container information to identify a security tool needed to perform a vulnerability scan of the container, accessing the security tool from a knowledge lake, running the security tool on the container information to identify a security vulnerability of the container, based on the running of the security tool, generating an alert indicating that the container has the security vulnerability, capturing the security vulnerability and, based on the captured security vulnerability, updating a container image that was used to spawn the container.

20 Claims, 9 Drawing Sheets

| PARAMETER | VULNERABLE/SCORE | POLICY | RECOMMENDED ACTION |
|---|---|---|---|
| SECURE IMAGE/NON-SECURE IMAGE | NO - % | THRESHOLD | ALERT + SHUTDOWN CONTAINER |
| DOCKER BENCH | SECURITY OPTIONS | DYNAMIC OPTIMAL OPTION GENERATOR | ALERT + CONFIGURATION |
| SYSTEM CALLS | IOCTL, DPDK | OS COMMANDS, KUBECTL COMMANDS, DOCKER COMMANDS, KERNEL CALLS | ALERT + CONFIGURATION |
| CONTAINERS PORT SCAN | PROTOCOL LEVEL | INTERNAL OR EXTERNAL CONTAINERS | ALERT + DISABLE PORT |
| NIDS (NETWORK INTRUSION DETECTION) | RULES | POLICIES BASED ON CONTAINER TYPE | ALERT |
| DOCKER STATS | USAGE STATISTICS | DURATION, UTILIZATION, IDLE STAGE | ALERT + SHUTDOWN |
| SECCOMP | NUMBER OF SYSTEM CALLS | FILTER PROFILE | ALERT |

FIG. 6

METHOD TO INTELLIGENTLY MANAGE THE END TO END CONTAINER COMPLIANCE IN CLOUD ENVIRONMENTS

FIELD OF THE INVENTION

Embodiments of the present invention generally relate to management of containers in a cloud computing environment. More particularly, at least some embodiments of the invention relate to systems, hardware, software, computer-readable media, and methods for establishing and maintaining container security.

BACKGROUND

In containerized computing environments, such as a Docker infrastructure for example, a huge number of containers gets scaled up/down in runtime environment with different workloads, different duration, and ages, configuration, port settings, security settings, and multiple vendor images. To ensure application of the best practices, and container security for each and every container, admins need to manually identify the appropriate security/management tools and analyze the scanned report to perform the preventive action. At present, this is a challenging and time-consuming task.

At present, there are few container monitoring solutions that optimize resource utilization and container failure and/or availability at the operating system (OS) and/or application level. Moreover, there are presently no solutions provided or implemented at a level above the user space (host) level to intelligently manage scaled-up containers and to dynamically apply corrective actions and to completely handle management and security of multiple containers. As well, conventional approaches do not provide intelligence from a device management console to identify and fix security loopholes for containers in real-time.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 6 discloses some examples of policy manager criteria that may be used in some embodiments.

DETAILED DESCRIPTION OF SOME EXAMPLE EMBODIMENTS

Figure 1:
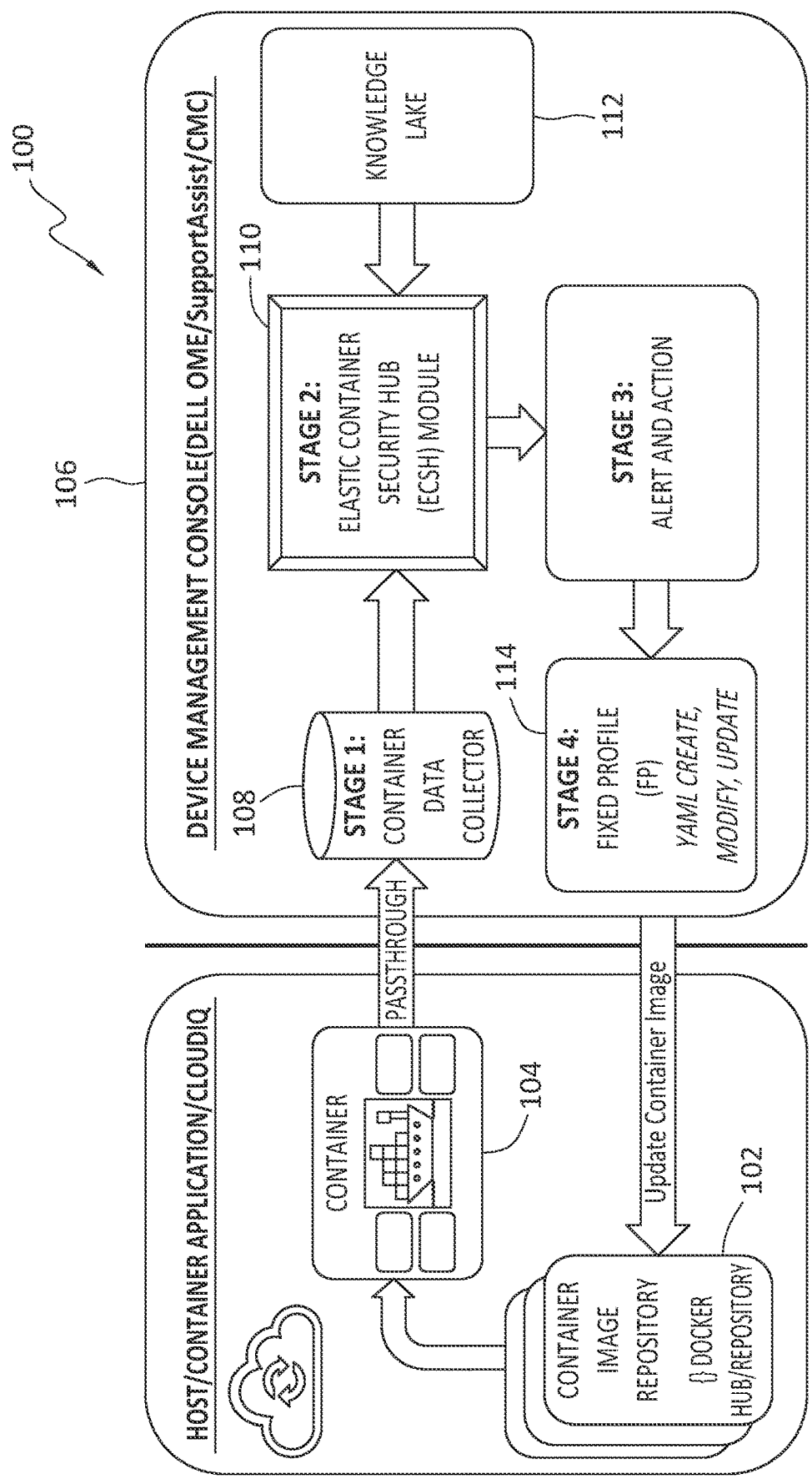
FIG. 1 discloses aspects of an example device management console and associated operations.

Embodiments of the present invention generally relate to management of containers in a cloud computing environment. More particularly, at least some embodiments of the invention relate to systems, hardware, software, computer-readable media, and methods for establishing and maintaining container security.

In general, example embodiments of the invention embrace methods to intelligently manage the end-to-end automated best container security guidelines from the device management console by analyzing the runtime container environment. Some example embodiments may also operate to identify and access the appropriate container security tool(s) for one or more containers by analyzing a container environment, which may be elastic in nature, to keep only the required tool, or tools, for the dynamically changing container environment. The container security tools which are required may be pulled and put back into a tools lake as dictated by the runtime container environment. As well, some example embodiments embrace methods for creating a container Fixed Profile (FP) which may capture any previously identified, and resolved, container security vulnerabilities. The FP may be applied during the creation of any new, similar, workload containers, to ensure that the new container do not have the same security loophole which has already been identified and fixed.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that a customized set of security tools needed to perform a scan of a container may be defined and implemented based on requirements and characteristics of the container. As another example, security fixes identified for, and implemented in, a container, may be applied to containers created based on the same image as the container such that new containers are automatically created with the security fixes already implemented. Various other advantageous aspects of some example embodiments will be apparent from this disclosure.

It is noted that embodiments of the invention, whether claimed or not, cannot be performed, practically or otherwise, in the mind of a human. As indicated by the illustrative examples disclosed herein, embodiments of the invention are applicable to, and find practical usage in, environments in which large numbers, such as hundreds or thousands for example, of containers may be handled and processed by a system according to example embodiments. The containers, which may be changing, added, and/or removed, on an ongoing and unpredictable basis, may be employed by numerous different applications in a containerized computing environment. Thus, the handling and processing of such containers is simply beyond the mental capabilities of any human to perform practically, or otherwise. Accordingly, nothing herein should be construed as teaching or suggesting that any aspect of any embodiment of the invention could or would be performed, practically or otherwise, in the mind of a human.

A. Aspects of Example Operating Environments

The following is a discussion of aspects of example operating environments for various embodiments of the invention. This discussion is not intended to limit the scope of the invention, or the applicability of the embodiments, in any way.

At least some embodiments may be implemented in connection with a cloud computing environment in which data processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

B. Overview

Ensuring container data management and container security is a common concern in a containerized environment, and it may be particularly challenging in a datacenter environment where multiple administrators may have to manage the scaled containers infrastructure environments. Some example embodiments may be employed in a Kubernetes environment, for example, but more generally, example embodiments may be employed in any other containerized computing environment in which one or more containers may be used, possibly on a temporary basis, to perform functions needed by an application. Thus, an application may be considered as containerized at least to the extent that the application may comprise, or at least be associated with, one or more containers that carry out application functions.

When implementing security for containers in such an environment, consideration may be given to a variety of container image security guidelines. Some example container configuration and security best practices that may be considered and implemented by some embodiments of the invention include, but are not limited to:

only use images from trusted vendors to avoid malware;
block or close the unused ports or add ACL for the ports used with strong security policies;
use thin, short-lived containers to reduce overall attack surface;
avoid mixing containers with each other, so as to protect critical data;
implement Docker Bench for security to analyze security settings;
configure containers properly to protect the host;
harden the host to safeguard all other containers in the environment; and
use seccomp (secure computing mode) to filter system calls (note that 'seccomp' refers to computer security functionality that may be implemented in the Linux kernel).

C. Aspects of Some Example Embodiments

In general, example embodiments may provide intelligence to manage n end-to-end automated security solution for a container from a device management console. Management of container security and its best practices from the device management console is currently not available.

Since example embodiments may operate one level above the host/OS level, that is, such embodiments may operate at, and be implemented by way of, a device management console level, the datacenter admin may have better control over the management of both the datacenter hardware and the host/cloud applications, from a single centralized console. A datacenter admin may have a reduced overload, since the security and management of the container may now be handled at the hardware level without requiring any intervention by the datacenter admin.

Example embodiments may employ an "Elastic Container Security Hub" (ECSH) module which may analyze the collected container data (such as, image vendor, port settings, security settings, and multiple vendor images) and may then identify the appropriate security tools to perform a vulnerability scan for the container. Embodiments of the ECSH may also have the intelligence to perform the needed base security scan of a container by analyzing the last scanned details. The ECSH may be elastic in nature since the container environment is dynamic and, based on the environment, the security tools employed may be dynamically scaled up and down.

Any identified security loopholes, weaknesses, or vulnerabilities, of a container may be fixed in the container YAML (YAML Ain't Markup Language) file where most of the security settings for the container may be configured. Note that as used herein, YAML refers to a human readable data serialization standard for programming languages. The user may have the option to customize the YAML file for fully, or partially, automated implementation of the security fixes. For example, the ECSH and/or other elements of the system may wait a specified period of time for a user to fix the security issues/vulnerabilities. If the period of time passes with no action taken by the user, the ECSH and/or other elements of the system may, automatically, partly or completely implement the security fixes in the container YAML file.

Embodiments of the invention may have the intelligence to capture all the fixes performed by the ECSH in the container YAML file. In more detail, an FP module of example embodiments may create/modify the container YAML file and update the container image repository to include the updated YAML file. Henceforth, whenever a new container request is received for the same image, all the security fixes may be updated permanently during the container creation process.

As a final example, some embodiments may enhance an existing OS pass through the channel to collect container/application details along with all the required security information. Further details concerning this aspect of some example embodiments are disclosed elsewhere herein.

C.1 Example Architecture

With reference now to FIG. 1, details are provided concerning an example architecture 100 according to some embodiments of the invention. As shown, a container image repository 102 may be provided that may include one or more containers 104. The containers may, or may not, be Kubernetes container images. The container image repository 102 may be configured to receive, such as from a device management console 106, and retrievably store, one or more container images. Container images may also be deleted from the container image repository 102. As shown in FIG. 1, and discussed further in connection with FIG. 2, the container image repository 102 may operate in connection with a passthrough.

The container image repository 102 and the container images 104 may reside or be hosted at any of a variety of entities. For example, a host device may host the container image repository 102 and the container images 104. As another example, the container image repository 102 and the container images 104 may be elements of a containerized application. As a final example, the container image repository 102 and the container images 104 may be hosted on a system such as the DellEMC CloudIQ platform. Such a system may, for example, provide cloud-based proactive monitoring and predictive analytics application for infrastructure products. The platform may combine the human intelligence of expert engineering and the machine intelligence of AI/ML to provide admins with the insight to more efficiently and proactively manage their IT infrastructure to meet business demand. See, e.g., https://www.delltechnologies.com/en-us/search.htm#q=cloudiq&sort=relevancy.

With continued reference to FIG. 1, and as noted above, the example architecture 100 may include a device management console 106 configured to communicate with the container image repository 102 and to receive one or more containers 104. In general, any containers received from the container image repository 102 may be stored in a database 108, such as a container data collector. The containers may be processed and evaluated by an ECSH module 110, which may also be referred to herein as an ECSH hub, of the device management console 106. As part of its operations, the ECSH module 110 may communicate with, and access, a knowledge lake 112. The knowledge lake 112, may comprise memory and/or storage for security rules and other information and metadata relating to the security of one or more containers. Information obtained from the knowledge lake 112 may be used as a basis for generating, such as by the ECSH module 110, various alerts and actions, which may then be used by an FP module 114 to create/modify/delete one or more YAML files, each of which may correspond to a respective container image. Updated container images may be transmitted by the FP module 114 to the container image repository 102.

C.2 Example Container Data Collector (CDC)

Figure 2:
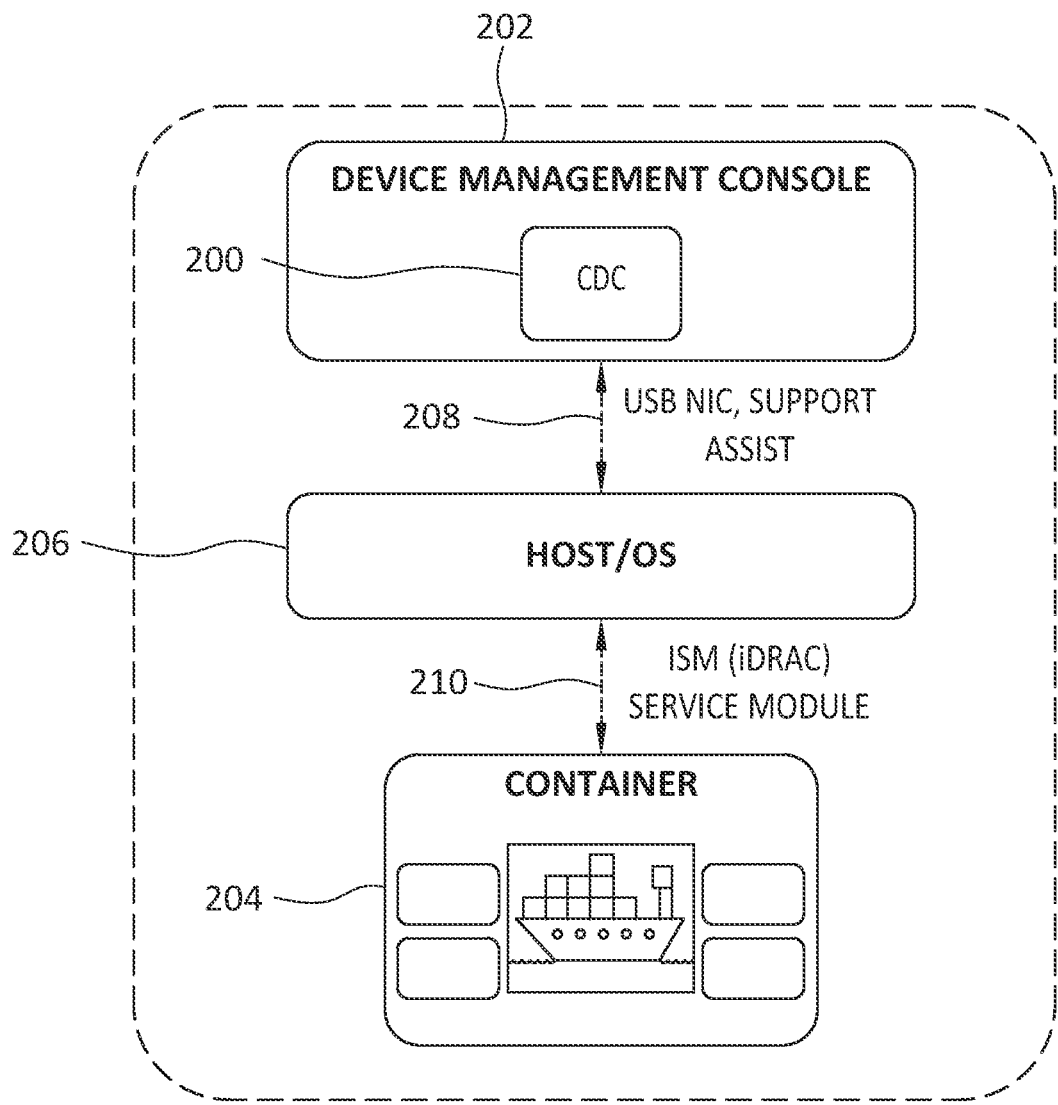
FIG. 2 discloses aspects of an example enhanced OS passthrough channel that may be employed in some embodiments.

With continued attention to FIG. 1, and directing attention now to FIG. 2 as well, details are provided concerning the configuration and operation of an example Container Data Collector (CDC) 200. As shown, the CDC 200 may be an element of a device management console 202 and may receive/transmit one or more containers 204 by way of a host/OS (Operating System) 206. In general, the configuration and operations disclosed in FIG. 2 may correspond to 'Stage 1' indicated in FIG. 1.

In this Stage 1, the CDC 200 may identify the container environment in the host 206 and may alert the device management console 106 (FIG. 1). All the container-specific information such as container workloads type, container duration, and age, configuration, port settings, security settings, image vendor source, may be provided to the device management console 106 through the Host/BMC passthrough channel 208 on a timely basis. In some cases, the passthrough channel 208 may require enhancement to collect all the above-mentioned container-specific information.

Particularly, the CDC 200 may send a test request, such as kubectl APIs, kubctl commands, and/or container/Docker commands for example, to the host 206 to test if the host 206 is a containerized environment. If the test run passes, meaning that the host 206 is confirmed by the CDC 200 as comprising or consisting of a containerized environment, then the device management console 202 may continue with the subsequent stage of initiating acquisition of all the container-related information mentioned above. The container-related information may be collected and presented to the device management console 202 by the CDC 200 using an enhanced pass-through channel 210, examples of which include Dell ISM, iDRAC USB NIC, and DellEMC Support Assist, between the device management console 202 and containers 204 on the host 206.

C.3 Example ECSH Module and Operations

As shown in FIG. 1, the collected container related information in Stage-1 may be analyzed by the Elastic Container Security (ECSH) Hub 110 to identify security tools that should be used to scan the container image and/or the container information. Based on the container specific environment, an appropriate set of tools may be intelligently identified from the knowledge/tools lake 112 for end-to-end container security management.

Figure 3:
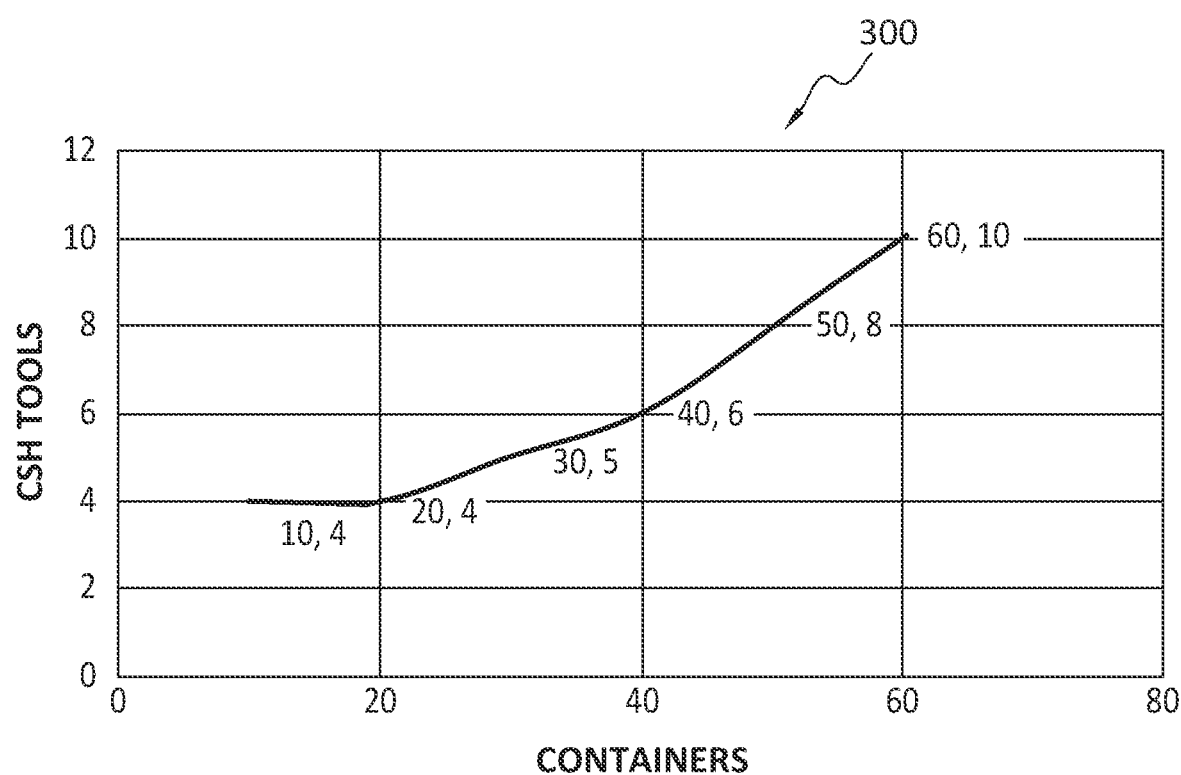
FIG. 3 discloses a graph indicating a relationship between running containers and associated security tools.

With reference now to FIG. 3 as well, embodiments of the ECSH 110 may be elastic in nature. That is, since the container environment is dynamic where containers often get scaled up/down and according to the container environment, the security tools may correspondingly be dynamically included and excluded for one or more particular containers.

For example, consider an environment in which there are 60+ containers running with various workload applications. For this, the number of required tools might be an arbitrary integer value X. In the example graph 300 of FIG. 3, 60 running containers may require about 10 tools. On the other hand, if the number of running containers is reduced to 30, for example, only 5 tools may be required. In this scenario then, the ECSH may not require all the tools which were used when the container was running at higher workload/numbers. That is, the ECSH is elastic in terms of the number of tools that may be required at any given time, or for any given number of containers. This approach may help to ensure that the ECSH does not occupy unused tools in the device management console, so as to keep the ECSH as lightweight as possible at any given time.

Figure 4:
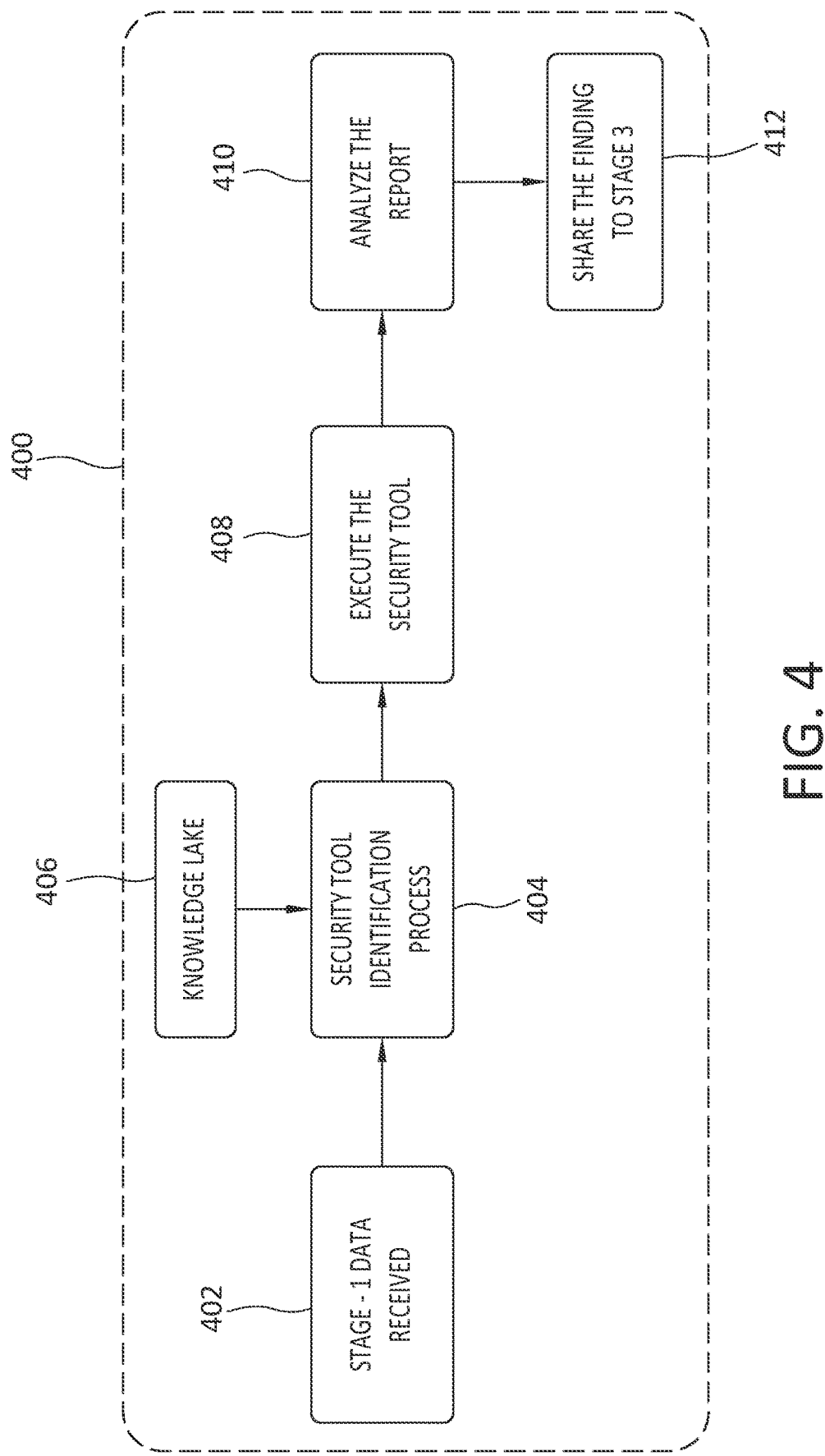
FIG. 4 discloses an example workflow of an elastic container security hub.

Turning next to FIG. 4, an example workflow 400 for an ECSH is disclosed. The workflow 400, along with the considerations noted in the discussion of FIG. 3, may constitute an example of Stage 2 (see, e.g., FIG. 1) of an example embodiment.

As shown in FIG. 4, an input 402 to the workflow 400 may be the output of Stage 1, that is data received from the CDC. As discussed elsewhere herein, such output may comprise container-related information concerning one or more containers. Next, the ECSH may analyze the input and identify 402 the security tool(s) required to scan the container(s). In general, each security tool may be used for a specific use case, and example embodiments may intelligently identify the appropriate tool for a given environment. Such analysis may comprise, for example, analyzing the open ports and the services running on each container in order to determine which respective tools are needed to scan one or more containers. In general, execution of a tool with respect to a container image and/or container information may serve to facilitate identification, and subsequent elimination, of a vulnerability of containers that were created using the container image.

In more detail, an example security tool identification process 404 may involve the use of a command to list all containers, and their respective exposed ports. The port information may provide useful insight as to, for example, the nature and type of communications undertaken by a container, the source(s) of the content being received by and/or transmitted from a container, and the port type and security of the port. One example of such a command may be: docker pa—quiet|xargs docker inspect—format '{{.id}}: Ports={{.NetworkSettings.Ports}}'. Once the port information has been obtained, the ECSH may use that information to determine which security tools to draw from the knowledge lake 406. Some examples of container security tools that may be employed in various embodiments of the invention may include Docker Bench, System calls—SECCOMP, OpenSCAP, and Sysdig Falco. In some embodiments, the ECSH may obtain the latest version of security tools from the knowledge lake, one example of which is the DellEMC support site. Only certified tools may be uploaded to the support site.

With continued reference to FIG. 4, at state 408 of the workflow 400, the ECSH may then execute the security tool(s) retrieved 406 from the knowledge lake. That is, the security tool may be used to perform a vulnerability scan of the container information, container, and/or container image. A report of the execution may be generated and analyzed 410. The report findings and analysis may then be shared 412 to Stage 3 (see FIG. 1, and FIG. 5 discussed below). The report may indicate, for example, potential threats that were identified based on analysis of the container data, and the effectiveness of the retrieved tools in eliminating or attenuating those threats.

C.4 Example Security Threads Alert & Action (STAA)

Figure 5:
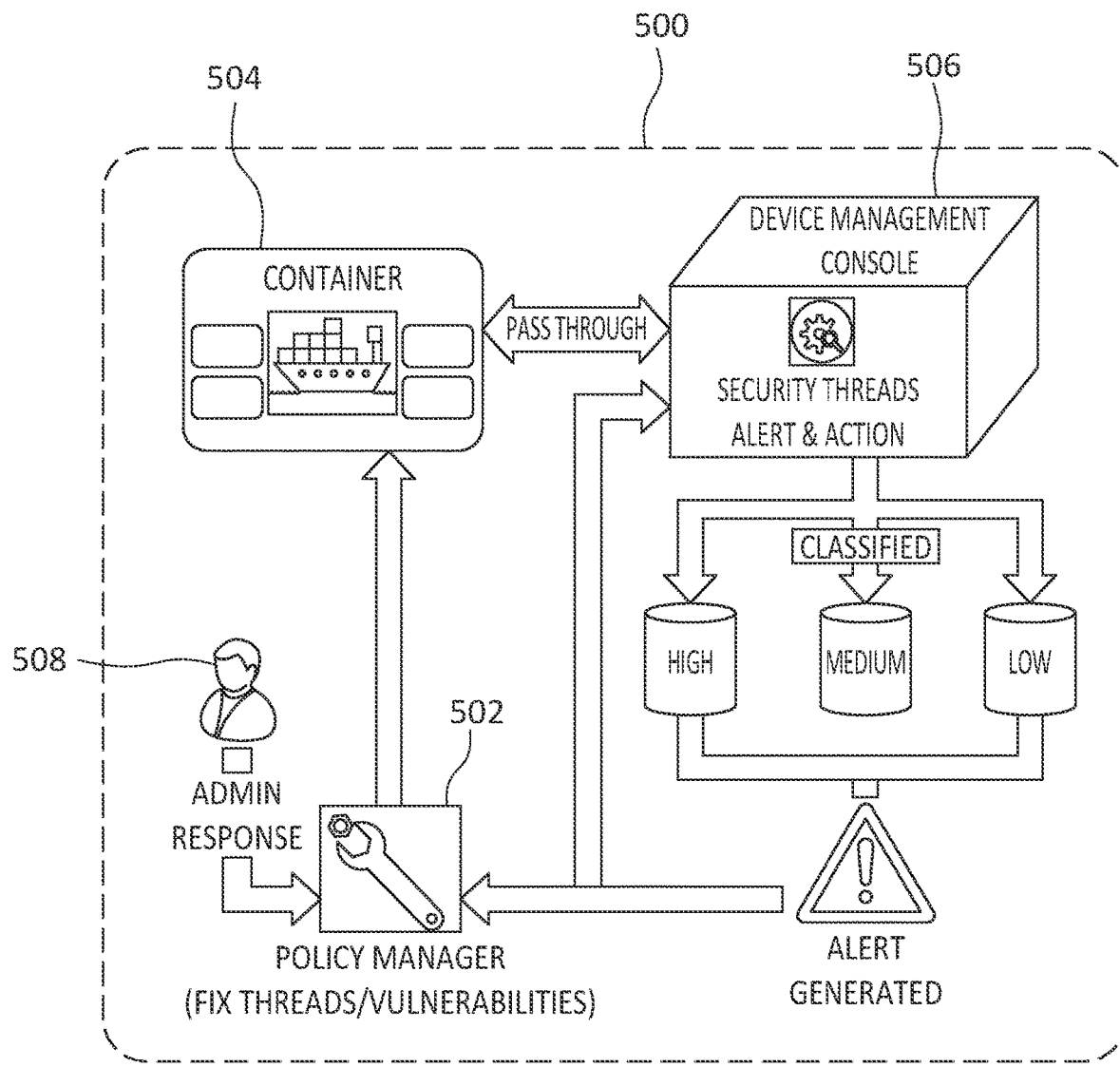
FIG. 5 discloses an example workflow for security threats alerts and action.

Turning next to FIG. 5, an example workflow 500, which may form part, or all, of a Stage 3 (see FIG. 1) implemented by some example embodiments, is disclosed. As indicated, the workflow 500 may involve various entities, including a policy manager 502, one or more containers 504, and a device management console 506. In the example Stage 3, one or more alerts may be generated for the identified vulnerabilities/threads by the ECSH (See reference 412 of FIG. 4/Stage2) and any corrective action that is required in the container environment may be applied. The security threats/vulnerabilities may be classified, such as 'low,' 'medium,' or 'high' for example, based on their relative criticality, and corresponding alerts may be generated and sent by the device management console 506.

As shown in FIG. 5, the policy manager 502 may take various actions based upon one or more defined policies, and based upon alerts and actions generated and taken by the device management console 506. Some example policy manager criteria 600, which may be used by the policy manager 502 as a basis for taking the various actions, are set forth in FIG. 6. Actions taken by the policy manager 502 may include, for example, fixing threads and vulnerabilities of a container by creating a new/modified FP (see FIG. 1) for a container image that was used as the basis to create that container. The new/modified FP may be updated to include corrections and refinements, identified by execution of one or more security rules, that may resolve or eliminate one or more vulnerabilities of one or more containers to which the FP applies.

With continued reference to FIG. 5, an admin 508 may be notified by the policy manager 502 that various threats or vulnerabilities of a container image should be addressed by updating the FP that corresponds to the container image. In some embodiments, the admin 508 may be required to review and approve the events for applying the action to the FP. A user-level time interval T1 may provided within which the admin has to review and take requisite action concerning an update to the container 9, image. Ff the admin 508 does not apply the action to the container image within the time interval T1, then the actions may be dynamically applied to the container image. Any further containers generated based upon the container image, as updated according to the FP, will then reflect the changes specified by the updated FP.

As noted earlier, various policy manager criteria 600, which may be used by the policy manager 502 as a basis for taking the various actions, may be employed in example embodiments. With reference now to FIG. 6, some examples of parameters 602, vulnerabilities 604, policies 606, and recommended actions 608, are disclosed. The parameters 602 may refer to an aspect of the configuration and/or operation of a container. The vulnerabilities 604 refer to an actual or potential vulnerability of a container. The policies 606 may specify, for example, the type of container involved. The recommended actions 608 may specify one or more actions to be taken in particular circumstances.

To illustrate with one example, one of the parameters 602 concerns network intrusion detection, and the rules concerning handling of network intrusion detection may represent a vulnerability 604. That is, such rules may be vulnerable to hacking, for example, so that a bad actor may be able to access the intrusion detection rules and eliminate or modify those rules so that intrusions will no longer be detected. In this example, the policy 606 for determining how to handle these particular circumstances may be based on the type of container involved. Where the policy applies, the recommended action 608 may be to transmit an alert that the network intrusion detection rules are vulnerable. At this point, a security tool may be run to determine if the tool effectively eliminates the vulnerability and, if so, the container image may be updated as dictated by the tool. The updated container image may then be sent to a container image repository, and any subsequent containers generated with that image will reflect the update that eliminates the vulnerability.

C.5 Example Fixed Profile (FP)

Figure 7:
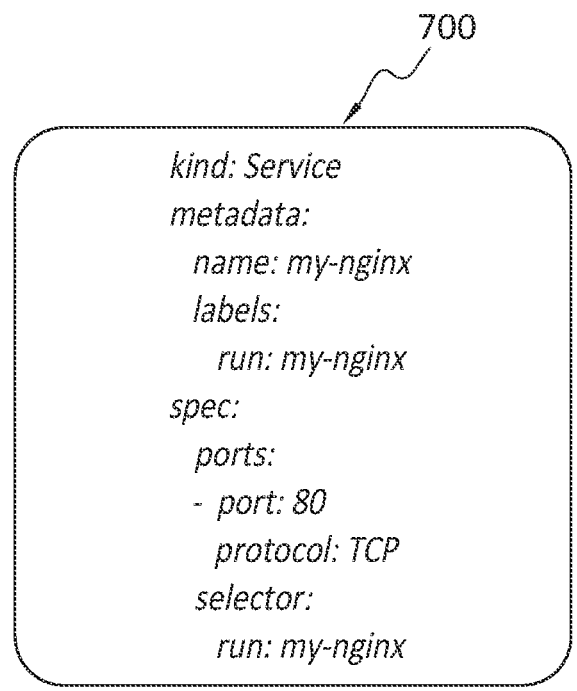
FIG. 7 discloses an example YAML file that may be used by an FP module.

Turning next to FIG. 7, an example YAML file 700 such as may be created and/or modified by an FP, which may be employed in connection with Stage 4 (see FIG. 1) implemented by some example embodiments, is disclosed. As noted in the discussion of FIG. 1, example embodiments may employ a Fixed Profile (FP) module (reference 114 in FIG. 1). In general, the FP module may capture the previously identified, and fixed, security vulnerabilities. For example, if any of the identified vulnerability requires port and services to be closed, the FP will be created based on the fixes which were performed previously.

When a new container creation request comes in for the same container image where the fix was applied in the previous stages, the FP will understand the new container creation request. The FP may then apply, to the container image, all the fixes which were performed for the same, and/or a similar, source container image. In this way, the new container being created in response to the container creation request will not have the already identified, and fixed, security loophole. In case the fixes may not be able to be applied through the YAML file 700, the FP may have other methods to apply the security loopholes fix, such as setting the Cron job/startup script for example.

Thus embodiments may operate relatively more efficiently than approaches in which a security fix is repeatedly implemented in each container of a group of containers. Instead, example embodiments need not perform the security scan of new containers for already fixed security loopholes, since those loopholes have already been fixed by virtue of changes to the container image that was used to spawn those containers, thus conserving bandwidth and resource usage. As such, embodiments of the invention may provide for effective management of containers, which may be spawned in the thousands or more, by dynamically implementing security requirements at the host/server level without requiring any manual intervention by a human to perform the implementation.

D. Further Discussion

As disclosed herein, example embodiments may implement a variety of useful features and functionalities. For example, some embodiments provide a method to intelligently manage the end-to-end automated best container security guidelines from a device management console by analyzing the runtime container environment. As another example, some embodiments provide a method to identify the appropriate container security tool by analyzing the container environment, which may be elastic in nature, to keep only the required tool(s) for the dynamically changing container environments. The container security tools which are required will be pulled and put back into the tools lake as per the runtime container environment. In a further example, some embodiments provide a method to create a container "Fixed Profile" (FP) which captures the previously identified and fixed container security vulnerabilities. The FP may be applied during the creation of any new similar workload containers, to ensure the new containers do not have the same security loophole which was already identified and fixed.

E. Example Methods

Figure 8:
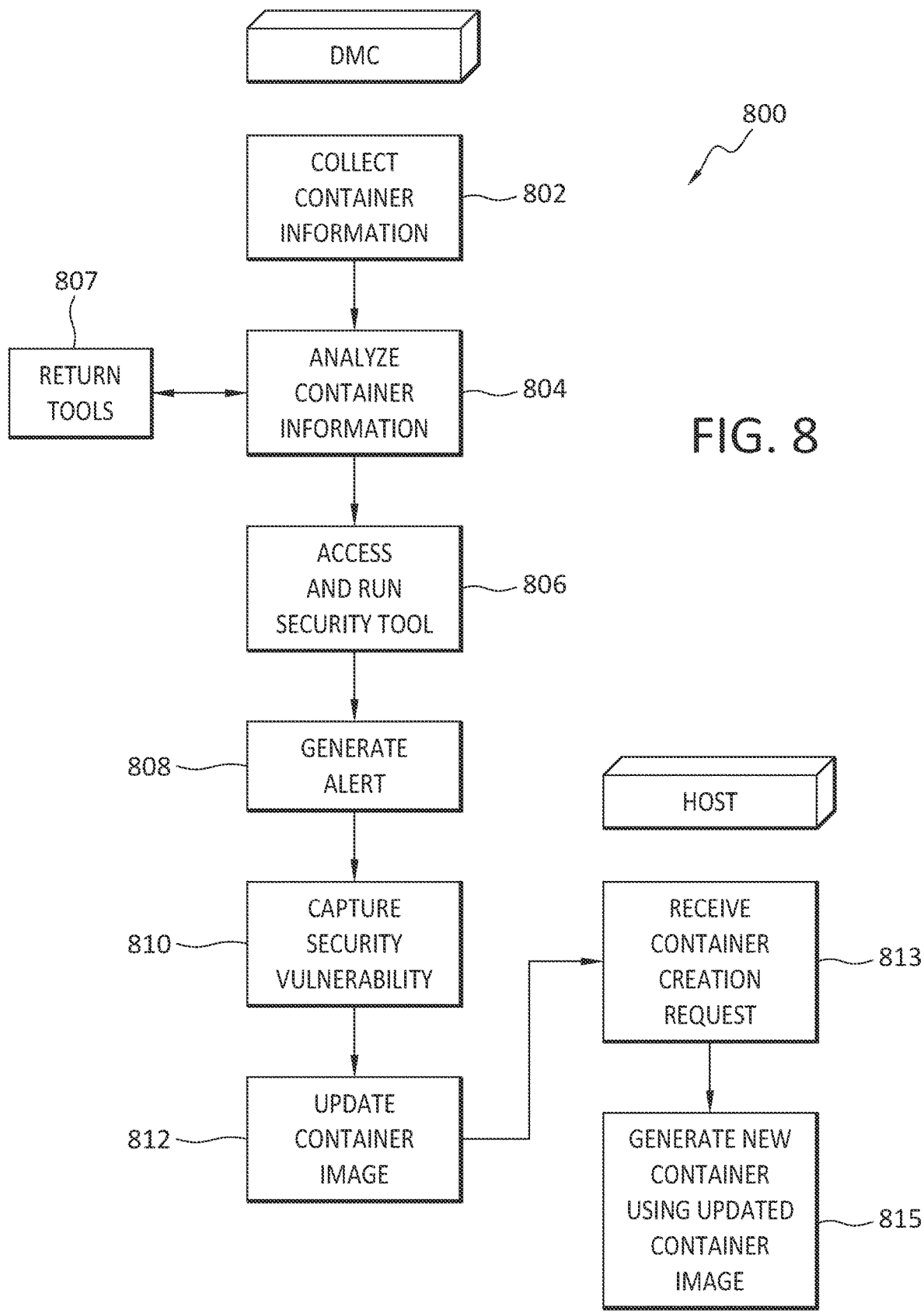
FIG. 8 discloses aspects of an example method according to some embodiments.

It is noted with respect to the example method of FIG. 8 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 8, an example method 800 may begin with the collection 802 of container information. The information may be collected by a device management console concerning a container that was generated based on a container image stored in a container image repository. The container may be a container that is already in service, or newly created. The collected container information may then be analyzed 804, such as by an ECSH for example, to identify one or more tools to be used to perform a vulnerability scan of the container, container information, and/or associated container image.

Based upon the results of the analysis 804, the device management console may access, such as from a knowledge lake for example, and run 806 one or more tools that are operable to identify any identified security vulnerabilities, as well as identify potential resolutions to those security vulnerabilities. The tools may be run on the container information that manifested the security vulnerabilities. In some embodiments, only the tools actually needed to identify the security vulnerabilities are accessed. Moreover, the tools may be returned to the knowledge lake 807 after they are no longer needed.

Based upon the outcome of the operation of the security tools with regard to the identified security vulnerabilities, one or more alerts may be generated 808. The alerts may be sent to an FP module that captures 810 the associated security vulnerabilities, and also tracks changes that have been made to one or more container images. The alerts may include information that may be used by the FP to update 812 a container image, such as information identifying a resolution to a security vulnerability identified by a vulnerability scan performed by a security tool. After the container image has been updated 812, any further containers generated based on that container image may no longer have the security vulnerabilities that were identified as a result of the running 806 of the security tools. The container image may be updated 812 by a human user, or automatically after the passage of a specified time interval after an FP module has issued a notification that the container image should be updated.

After the container image, which may have been stored in a container image repository, has been updated 812, the updated container image may be available for use in spawning one or more containers. For example, a host that holds a container image repository may receive a container creation request 813. In response to the request 813, the host may generate one or more new containers 815 using the updated container image. Because the container image was updated to eliminate the captured security vulnerabilities, assurance may be had that the newly spawned containers do not have or contain those security vulnerabilities.

The method 800 may be performed on an ongoing basis, or on an ad hoc basis, such as whenever a new security vulnerability is identified. In some embodiments, the container creation request 813 may specify, for example, that hundreds or thousands, for example, of new containers be generated. The number of particular containers needed in an operating environment may scale up and/or down automatically according to the needs of the applications running in that environment.

F. Further Example Embodiments

Following are some further example embodiments of the invention. These are presented only by way of example and are not intended to limit the scope of the invention in any way.

Embodiment 1. A method, comprising: A method, comprising the operations: collecting container information concerning a container; analyzing the container information to identify a security tool needed to perform a vulnerability scan of the container; accessing the security tool from a knowledge lake; running the security tool on the container information to identify a security vulnerability of the container; based on the running of the security tool, generating an alert indicating that the container has the security vulnerability; capturing the security vulnerability; and based on the captured security vulnerability, updating a container image that was used to spawn the container.

Embodiment 2. The method as recited in embodiment 1, wherein capturing the security vulnerability comprises updating a fixed profile associated with the container to indicate that the container has the security vulnerability and to indicate a resolution to the security vulnerability.

Embodiment 3. The method as recited in any of embodiments 1-2, wherein updating the container image comprises modifying the container image to eliminate the security vulnerability.

Embodiment 4. The method as recited in any of embodiments 1-3, wherein the alert further indicates a security fix to the security vulnerability.

Embodiment 5. The method as recited in any of embodiments 1-4, wherein the security vulnerability is captured in a fixed profile associated with the container, and the fixed profile includes all security fixes that have been previously implemented with respect to the container.

Embodiment 6. The method as recited in any of embodiments 1-5, wherein a new container created with the updated container image includes a security fix identified by the alert.

Embodiment 7. The method as recited in any of embodiments 1-6, wherein the container information is collected and presented to a device management console by way of a pass-through channel between the device management console and a host that includes the container.

Embodiment 8. The method as recited in any of embodiments 1-7, wherein a number of security tools employed by an elastic container security hub scales up and/or down in accordance with a number of containers that are running.

Embodiment 9. The method as recited in any of embodiments 1-8, wherein the container image is updated automatically when a human user does not respond to the alert within a specified time interval.

Embodiment 10. The method as recited in any of embodiments 1-9, wherein the operations further comprise receiving a new container request, and generating a new container using the updated container image.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
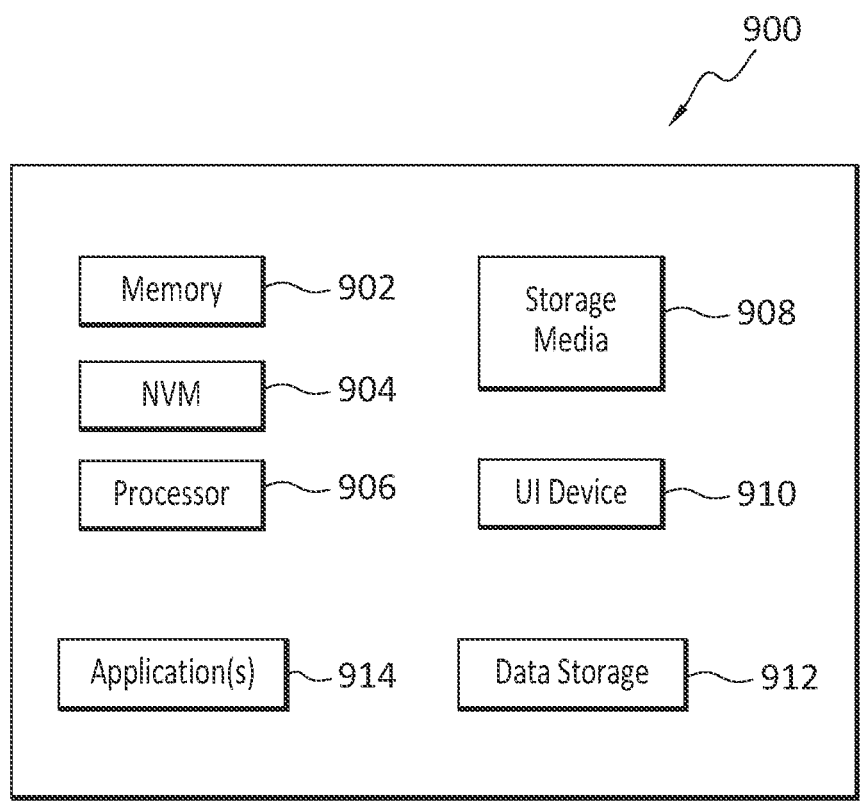
FIG. 9 discloses aspects of an example computing entity operable to perform any of the disclosed methods, processes, and operations.

With reference briefly now to FIG. 9, any one or more of the entities disclosed, or implied, by FIGS. 1-8 and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising the operations:
    collecting container information concerning a container with port information of communication undertaken by the container;
    analyzing the container information and the port information to identify a security tool needed to perform a vulnerability scan of the container;
    accessing the security tool from a knowledge lake;
    running the security tool on the container information to identify a security vulnerability of the container;
    based on the running of the security tool, generating an alert indicating that the container has the security vulnerability;
    capturing the security vulnerability; and
    based on the captured security vulnerability, updating a container image that was used to spawn the container.

2. The method as recited in claim 1, wherein capturing the security vulnerability comprises updating a fixed profile associated with the container to indicate that the container has the security vulnerability and to indicate a resolution to the security vulnerability.

3. The method as recited in claim 1, wherein updating the container image comprises modifying the container image to eliminate the security vulnerability.

4. The method as recited in claim 1, wherein the alert further indicates a security fix to the security vulnerability.

5. The method as recited in claim 1, wherein the security vulnerability is captured in a fixed profile associated with the container, and the fixed profile includes all security fixes that have been previously implemented with respect to the container.

6. The method as recited in claim 1, wherein a new container created with the updated container image includes a security fix identified by the alert.

7. The method as recited in claim 1, wherein the container information is collected and presented to a device management console by way of a pass-through channel between the device management console and a host that includes the container.

8. The method as recited in claim 1, wherein a number of security tools employed by an elastic container security hub scales up and/or down in accordance with a number of containers that are running.

9. The method as recited in claim 1, wherein the container image is updated automatically when a human user does not respond to the alert within a specified time interval.

10. The method as recited in claim 1, wherein the operations further comprise receiving a new container request, and generating a new container using the updated container image.

11. A computer readable storage medium having stored therein instructions that are executable by one or more hardware processors to perform operations comprising:
    collecting container information concerning a container with port information of communication undertaken by the container;
    analyzing the container information and the port information to identify a security tool needed to perform a vulnerability scan of the container;
    accessing the security tool from a knowledge lake;
    running the security tool on the container information to identify a security vulnerability of the container;
    based on the running of the security tool, generating an alert indicating that the container has the security vulnerability;
    capturing the security vulnerability; and
    based on the captured security vulnerability, updating a container image that was used to spawn the container.

12. The computer readable storage medium as recited in claim 11, wherein capturing the security vulnerability comprises updating a fixed profile associated with the container to indicate that the container has the security vulnerability and to indicate a resolution to the security vulnerability.

13. The computer readable storage medium as recited in claim 11, wherein updating the container image comprises modifying the container image to eliminate the security vulnerability.

14. The computer readable storage medium as recited in claim 11, wherein the alert further indicates a security fix to the security vulnerability.

15. The computer readable storage medium as recited in claim 11, wherein the security vulnerability is captured in a fixed profile associated with the container, and the fixed profile includes all security fixes that have been previously implemented with respect to the container.

16. The computer readable storage medium as recited in claim 11, wherein a new container created with the updated container image includes a security fix identified by the alert.

17. The computer readable storage medium as recited in claim 11, wherein the container information is collected and presented to a device management console by way of a pass-through channel between the device management console and a host that includes the container.

18. The computer readable storage medium as recited in claim 11, wherein a number of security tools employed by an elastic container security hub scales up and/or down in accordance with a number of containers that are running.

19. The computer readable storage medium as recited in claim 11, wherein the container image is updated automatically when a human user does not respond to the alert within a specified time interval.

20. The computer readable storage medium as recited in claim 11, wherein the operations further comprise receiving a new container request, and generating a new container using the updated container image.

* * * * *